(12) United States Patent
Nishijima et al.

(10) Patent No.: US 7,187,958 B2
(45) Date of Patent: Mar. 6, 2007

(54) FOLDING MOBILE COMMUNICATIONS APPARATUS

(75) Inventors: Katsumi Nishijima, Tokyo (JP); Akiko Shishido, Tokyo (JP); Michio Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 10/834,999

(22) Filed: Apr. 30, 2004

(65) Prior Publication Data
US 2004/0219957 A1 Nov. 4, 2004

(30) Foreign Application Priority Data
Apr. 30, 2003 (JP) .............................. 2003-124681

(51) Int. Cl.
*H04M 1/00* (2006.01)
(52) U.S. Cl. ................ 455/575.3; 455/90.3; 455/575.1; 455/550.1; 455/566; 455/575.4; 361/683
(58) Field of Classification Search ............. 455/575.3, 455/90.3, 550.1, 550, 566; 361/683
See application file for complete search history.

(56) References Cited

U.S. PATENT DOCUMENTS

| | | | | |
|---|---|---|---|---|
| 5,917,695 | A * | 6/1999 | Youn | 361/683 |
| 6,549,789 | B1 * | 4/2003 | Kfoury | 455/550.1 |
| 6,775,560 | B2 * | 8/2004 | King et al. | 455/566 |
| 6,944,484 | B2 * | 9/2005 | Yasuda | 455/575.3 |
| 2002/0198029 | A1 * | 12/2002 | Tenhunen et al. | 455/566 |
| 2004/0203527 | A1 * | 10/2004 | Matsumoto | 455/90.3 |
| 2006/0063570 | A1 * | 3/2006 | Nishimura | 455/575.3 |

FOREIGN PATENT DOCUMENTS

| | | | |
|---|---|---|---|
| JP | 11-215218 | * | 6/1999 |
| JP | 2001-320463 | | 11/2001 |
| JP | 2002-96313 | | 4/2002 |
| JP | 2002-281135 | | 9/2002 |
| JP | 2003-174495 | | 6/2003 |

* cited by examiner

*Primary Examiner*—Lester G. Kincaid
*Assistant Examiner*—Charles Shedrick
(74) *Attorney, Agent, or Firm*—Young & Thompson

(57) ABSTRACT

A folding mobile communications apparatus comprises an upper unit 200, a lower unit 100, and a hinge 300 for connecting the units as rotatable in an open-and-close state. On a main surface 201a of the upper unit 200, a first speaker 203 is provided at one end of the unit, and a second speaker 230 having at least the function of a receiver is provided near the hinge 300. On the main surface 101a of the lower unit 100, a microphone 103 is provided at an end opposite the hinge 300. A control unit 117 controls the first speaker 203, the second speaker 230, and the microphone 103 such that any two of them can function as a set of a receiver and a transmitter based on a relative position of the two units detected by an attitude detection unit 113.

3 Claims, 12 Drawing Sheets

FOLDING MOBILE COMMUNICATIONS APPARATUS

BACKGROUND OF THE INVENTION

1. Field of the Invention

The present invention relates to a folding mobile communications apparatus, and more specifically to a folding mobile communications apparatus (mobile communications terminal) having conversation capabilities such as a mobile telephone, etc.

2. Description of the Prior Art

Recently, in the technological field of a mobile telephone, which is a typical mobile communications apparatus (mobile communications terminal), a number of models loaded with various functions of an Internet browser, electronic mail, etc. have appeared on the market. Such mobile telephones normally have folding structure with a view to having a larger area of a display unit. Most folding mobile telephones have the structure of exposing the display and the keys with two housings which form the main unit of the telephone opened during a telephone conversation. However, folding structures in which the display can face outside with the housings closed have been proposed lately.

For example, Japanese Patent Laid-Open No. 2001-320463 (Patent Document 1) has disclosed a mobile terminal apparatus capable of closing the housings with the display device facing outside by the ridge containing the display device connected to the main unit of the housings as rotatable in two axis directions (refer to the document in paragraphs 0025 and 0026 and FIG. 2).

Furthermore, Japanese Patent Laid-Open No. 2002-281135 (Patent Document 2) has proposed a mobile telephone capable of playing back music, etc. in stereo. Practically, according to the document, an electric signal oscillation converter capable of functioning as speaker and microphone is mounted on the back of each of the two housings, one of which functions as a speaker, and the other as a microphone in a communications mode, and as a speaker in a music playback mode (refer to the document in paragraphs 0027 to 0028 and FIG. 2). In the document, the speaker capability and the microphone capability can be switched between them automatically by the CPU (central processing unit) contained in the mobile telephone (refer to the paragraph 0031).

However, in the folding mobile telephones disclosed in the Patent Documents 1 and 2, a conversation can be realized with the mobile telephone opened only. Especially, the mobile telephone disclosed by the Patent Document 1 is assumed to realize the function of a camera with the display device facing outside. However, the mobile telephone is to be used in the open state for the conversation capabilities. Therefore, if a conversation is made when the mobile telephone is closed with the display device facing outside, a user has to open the two folded housings, which is an inconvenient operation for the user.

In addition, to realize a conversation with the two housings closed, it is necessary to provide a speaker and a microphone on the backs (outside) of the housings, which does not enhance the appearance of the mobile telephone.

SUMMARY OF THE INVENTION

The present invention has been developed to solve the above-mentioned problems, and aims at providing a folding mobile communications apparatus which excels in the operability in conversation capabilities regardless of the arrangement of the housings.

To solve the above-mentioned problems with the conventional technology, the folding mobile communications apparatus according to the present invention has the following configuration.

That is, the folding mobile communications apparatus comprises a first housing (upper unit 200), a second housing (lower unit 100), and a hinge (300) for connecting the first housing and the second housing rotatable in an open-and-close state.

The apparatus comprises conversion means (microphone 103, speakers 203 and 330, speaker/microphone 203a, 203b, 240, and 241), which is provided in at least one of the first housing, the second housing, and the hinge, for functioning as at least one of a receiver and a transmitter.

In a closed state of the first housing and the second housing, on which the first inner surface (main surface 201a) of the first housing (200) is exposed outside, and the first inner surface (101a) of the second housing (100) is substantially hidden, a couple of the conversion means function as a set of a receiver and a transmitter.

And also, in the closed state, the couple of the two conversion means face outside direction which is the same direction facing the first inner surface (main surface 201a).

Another aspect of the present invention is a folding mobile communications apparatus having a first housing (upper unit 200), a second housing (lower unit 100), and a hinge (300) for connecting the first housing and the second housing rotatable in an open-and-close state. The apparatus comprises:

first conversion means (speaker 203, speaker/microphone 203a) which are provided at another end portion opposite the hinge on the first inner surface (main surface 201a) of the first housing (200), and have at least the function of a receiver;

second conversion means (speaker 230) which is provided at the hinge on the first inner surface, and has at least the function of a receiver;

third conversion means (microphone 103) which is provided at another end portion opposite the hinge on the second inner surface (main surface 101a) of the second housing, and has at least the function of a transmitter;

detection means (attitude detection unit 113) for detecting a relative position between the first housing and the second housing; and control means (control unit 117) for controlling means selected from among the first, second and third conversion means based on the position detected by the detection means to function as at least a set of a receiver and a transmitter.

With the above-mentioned configuration, for example, the control means (control unit 117) controls:

the first conversion means (speaker 203) to function as a receiver and the third conversion means (103) to function as a transmitter when the first and second inner surfaces (101a, 201a) are detected, as the relative positions, as being exposed outside by being opened the first and second housings (100, 200), and the second conversion means (speaker 230) to function as a receiver and the third conversion means (microphone 103) to function as a transmitter when the first and second housings are detected, as the relative positions, as being closed such that the first inner surface (201a) of the first housing (200) is exposed outside and the first inner surface (101a) of the second housing (100) is substantially hidden from outside.

Otherwise, with the above-mentioned, for example, the first conversion means (speaker/microphone 203a) has two functions of a receiver and a transmitter, and is able to switch between the functions, and the control means (control unit 117) controls:

the first conversion means (203a) to function as a receiver and the third conversion means (microphone 103) to function as a transmitter when the first and second inner surfaces (101a, 201a) are detected, as the relative positions, as being exposed outside by being opened the first and second housings (100, 200), and the first conversion means (speaker/microphone 203a) to function as a transmitter and the second conversion means (speaker 230) to function as a receiver when the first and second housings are detected, as the relative positions, as being closed such that the first inner surface (201a) of the first housing (200) is exposed outside and the first inner surface (101a) of the second housing (100) is substantially hidden from outside.

Furthermore, as a further aspect of the present invention, a folding mobile communications apparatus having a first housing (200), a second housing (100), and a hinge (300) for connecting the first housing and the second housing as rotatable in a open-and-close state.

The apparatus comprises:

first conversion means (speaker/microphone 240) which is provided at another end portion opposite the hinge on the first inner surface (201a) of the first housing (200), has two functions of a receiver and a transmitter, and is able to switch the functions;

second conversion means (speaker/microphone 241) which is provided at the hinge of the first inner surface (201a), has two functions of a receiver and a transmitter, and is able to switch the functions;

detection means (attitude detection unit 113) for detecting a relative position between the first housing and the second housing; and control means (control unit 117) for controlling the first conversion means and the second conversion means such that one means is able to function as a receiver and another means is able to function as a transmitter based on the relative position detected by the detection means.

Furthermore, as a further aspect of the present invention, a folding mobile communications apparatus having a first housing (200), a second housing (100), and a hinge (300) for connecting the first housing and the second housing as rotatable in a open-and-close state.

The apparatus comprises:

first conversion means (speaker/microphone 203b) which is provided at another end portion opposite the hinge on the first inner surface (201a) of the first housing (200), has two functions of a receiver and a transmitter, and is able to switch the functions;

second conversion means (speaker 330) which is provided at the hinge, and has at least the function of a receiver;

third conversion means (microphone 103) which is provided at another end portion opposite the hinge on a second inner surface (101a) of the second housing (100), and has the function of a transmitter;

detection means (attitude detection unit 113) for detecting a relative position between the first housing and the second housing; and control means (control unit 117) for controlling means selected from among the first, second and third second conversion means based on the relative positions detected by the detection means to function as at least one set of a receiver and a transmitter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above-mentioned and other objects, features and advantages of the present invention will become more apparent from the following detailed description when taken in conjunction with the accompanying drawings wherein:

FIG. 1(a) is a plan view of the upper unit in the open state. FIG. 1(b) is a plan view of the mobile telephone with the display facing inside in the closed state. FIG. 1(c) is a plan view from the display with the display facing outside in the closed state;

FIG. 3(a) shows the arrangement of a magnetic sensor provided in the lower unit 100. FIG. 3(b) shows the arrangement of the magnet provided in the upper unit 200;

FIG. 6(a) is a plan view of the upper unit in the open state. FIG. 6(b) is a plan view of the mobile telephone with the display facing inside in the closed state. FIG. 6(c) is a plan view from the display with the display facing outside in the closed state;

FIG. 8(a) is a plan view of the upper unit in the open state. FIG. 8(b) is a plan view of the mobile telephone with the display facing inside in the closed state. FIG. 8(c) is a plan view from the display with the display facing outside in the closed state;

FIG. 10(a) is a plan view of the upper unit in the open state. FIG. 10(b) is a plan view of the mobile telephone with the display facing inside in the closed state. FIG. 10(c) is a plan view from the display with the display facing outside in the closed state;

DETAILED DESCRIPTION OF THE PREFERRED EMBODIMENTS

Figure 1:
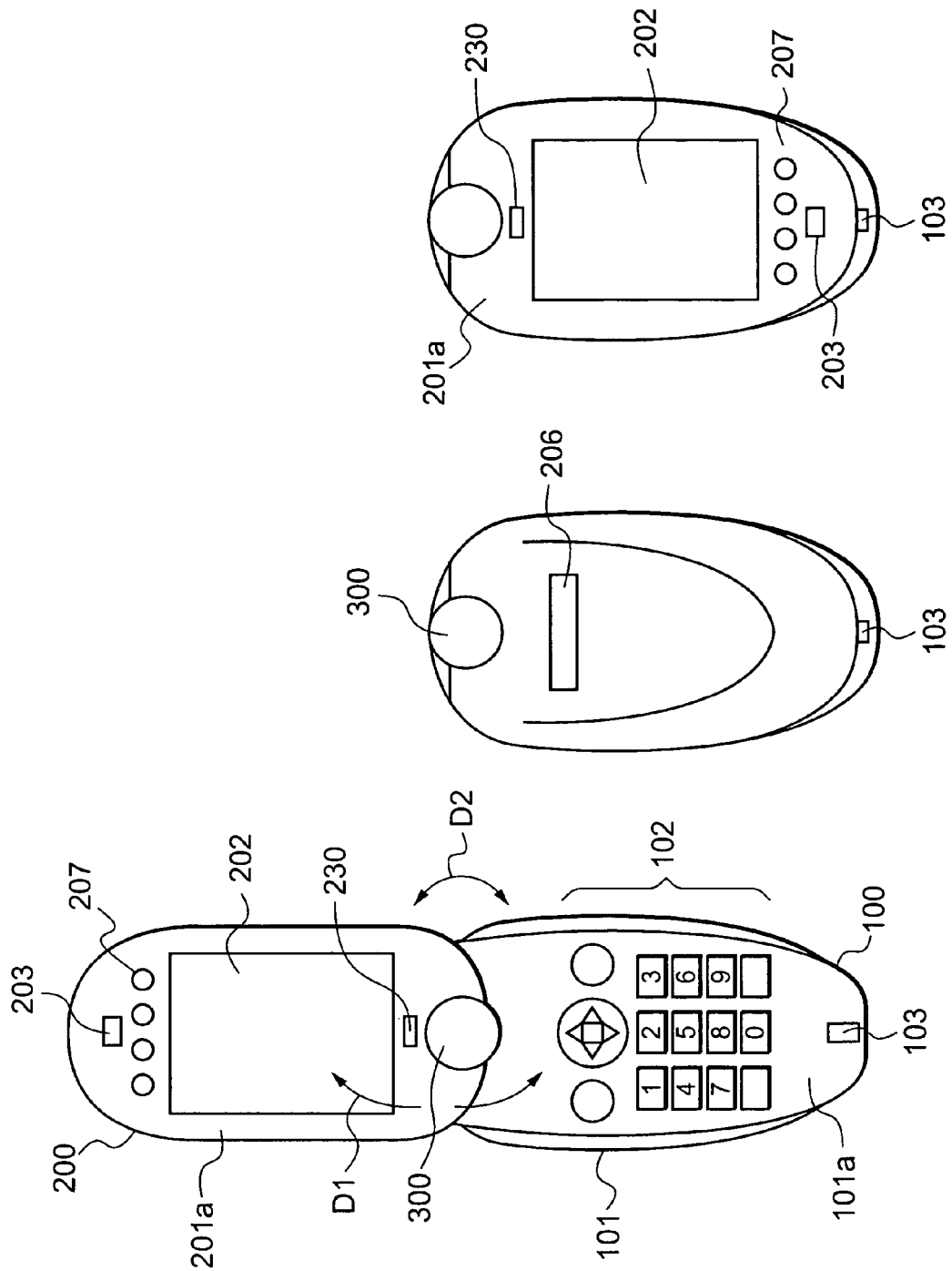
FIGS. 1(A) to 1(C) are explanatory view of the configuration and the operation of the folding mobile telephone according to the first embodiment of the present invention. That is.

Preferred embodiments of the present invention will now be described in detail in accordance with the accompanying drawings.

The configurations and the operations of the folding mobile communications apparatus according to the present invention are explained below by referring to a mobile telephone for example.

First Embodiment

FIGS. 1(a) to 1(c) are explanatory view of the configuration and the operation of the folding mobile telephone according to the first embodiment of the present invention.

That is, FIG. 1(a) is a plan view of the upper unit in the open state. FIG. 1(b) is a plan view of the mobile telephone with the display facing inside in the closed state. FIG. 1(c) is a plan view from the display with the display facing outside in the closed state.

As shown in FIGS. 1(a) to 1(c), the folding mobile telephone according to the present embodiment is mainly configured by the lower unit 100 (second housing), the upper unit 200 (first housing), and the 2-axis hinge 300 for connection of the units. The hinge 300 allows the upper unit 200 to be moved to the open/closed state (as indicated by the arrow D1) and turned (in the direction indicated by the arrow D2) relative to the lower unit 100 as described later.

The lower unit 100 and the upper unit 200 have a predetermined thickness. In the present embodiment, for example, they are flat and elliptical in substantially the same size. The lower unit 100 comprises a key operation unit 102 including ten keys on the main surface 101a, and the microphone (transmitter) 103. According to the present embodiment, the lower unit 100 is somewhat longer than the upper unit 200, and it is desired to design the two units such that the microphone 103 can be exposed, or a space can be kept at the tip portion of the lower unit 100 to collect the voice of a user in the closed state as shown in FIG. 1(c).

On the main surface 201a of the upper unit 200, a substantially rectangular display 202 is arranged vertically (that is, in the longitudinal direction of the mobile telephone). The upper unit 200 comprises a first speaker (receiver) 203 and a secondary operation key 207 on the main surface 201a above the display 202, and a second speaker (receiver) 230 at the lower portion on the main surface 201a. On the back of the upper unit 200, a small secondary display 206 is mounted.

In the closed state as shown in FIG. 1(b) (that is, in the state in which the display 202 is included by the folded units 100 and 200, the respective main surfaces 101a and 201a of the lower unit 100 and the upper unit 200 are overlapped. Therefore, the units protect the key operation unit 102, the display 202, etc.

When the upper unit 200 is opened from the closed state as shown in FIG. 1(b) in the direction indicated by the arrow D1 (that is, in the 3-dimensional direction which is also mentioned in the subsequent descriptions) as shown in FIG. 1(a), the key operation unit 102, the display 202, the microphone 103, the first speaker 203, and the second speaker 230 are exposed. When the two units 100 and 200 are in the open state, the user can perform key operations such as dialing, data input, etc., and start a conversation.

By turning the upper unit 200 from the open state as shown in FIG. 1(a) in the direction indicated by the arrow D2 (that is, the direction parallel to the drawing which is also mentioned in the subsequent descriptions), the upper unit 200 can be set in the closed state in which the upper unit 200 is laid on the lower unit 100 with the main surface 201a facing outside.

In this closed state (that is, the main surface 201a of the upper unit 200 is exposed outside while the folded units 100 and 200 hide substantially completely from view the main surface 101a of the lower unit 100), the first speaker 203 and the second speaker 230 in addition to the display 202 are exposed outside. As described later, in the closed state, the second speaker 230 functions as a receiver, and the microphone 103 functions as a transmitter.

Briefly described below is an example of the 2-axis hinge 300 for the above-mentioned open/close settings and turning operation. The structure and the operation of the 2-axis hinge 300 are described in the specifications of Japanese Patent Application No. 2001-303959 and Japanese Patent Application No. 2002-189488 for claim for a domestic priority. That is, the technology described in the specifications is included in the scope of the specifications of the present application.

Figure 2:
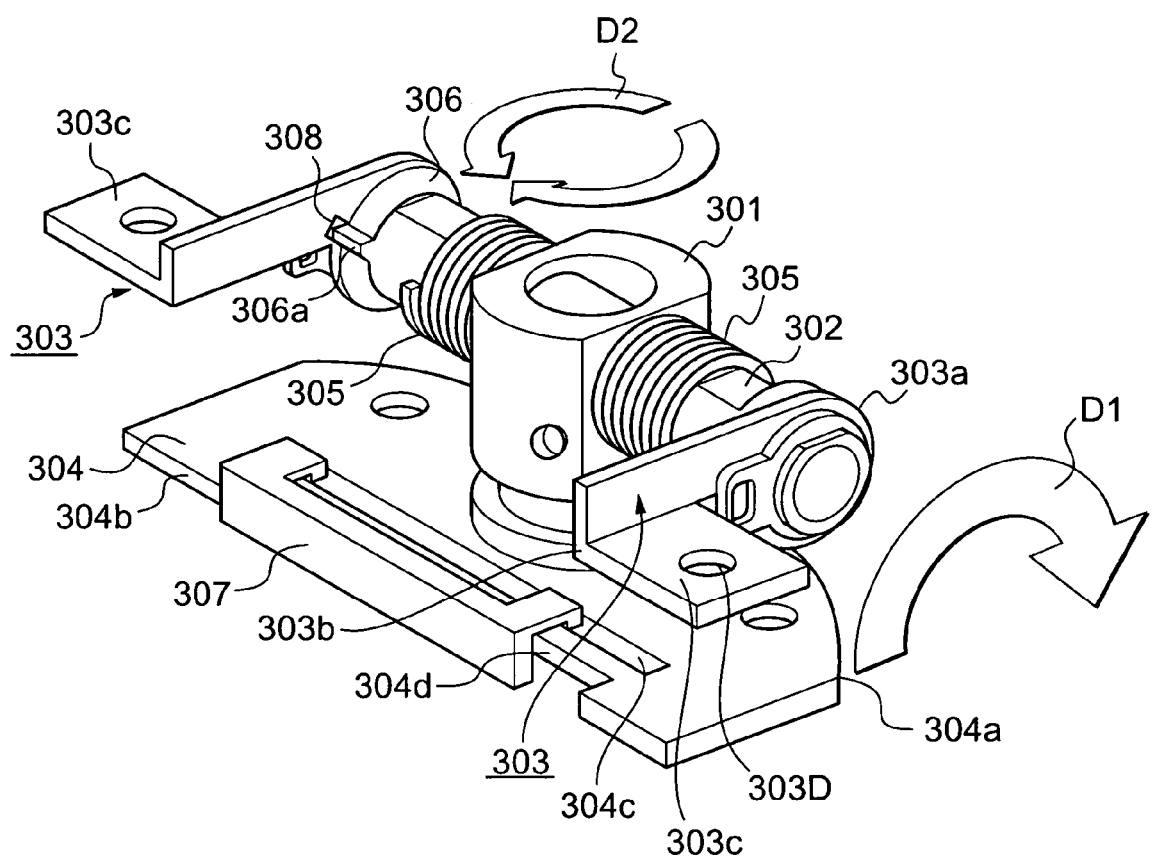
FIG. 2 is a perspective view of a hinge unit used in the first embodiment of the present invention.

FIG. 2 is a perspective view of a hinge unit (hinge 300) used in the first embodiment of the present invention. In FIG. 2, a base plate 304 is fixed to the lower unit 100. At the center of the base plate 304, a rotation axis 301 is vertically attached through a rotation torque generation unit (not shown in the attached drawings). The rotation axis 301 is held as rotatable in the direction indicated by the arrow D2. On the rotation axis 301, an open/close axis 302 horizontally extending and orthogonally to the rotation axis 301 is held as rotatable in the direction indicated by the arrow D1. An L-shaped bracket 303 is attached on both sides of the open/close axis 302, and fixed to the upper unit 200. Additionally, open/close torque generation units 305, 306, and 308 are provided for the open/close axis 302 to generate an open/close torque in the direction indicated by the arrow D1. The above-mentioned hinge 300 enables the opening/closing and turning operations as described above by referring to FIGS. 1(a) to 1(c).

Figure 3A:
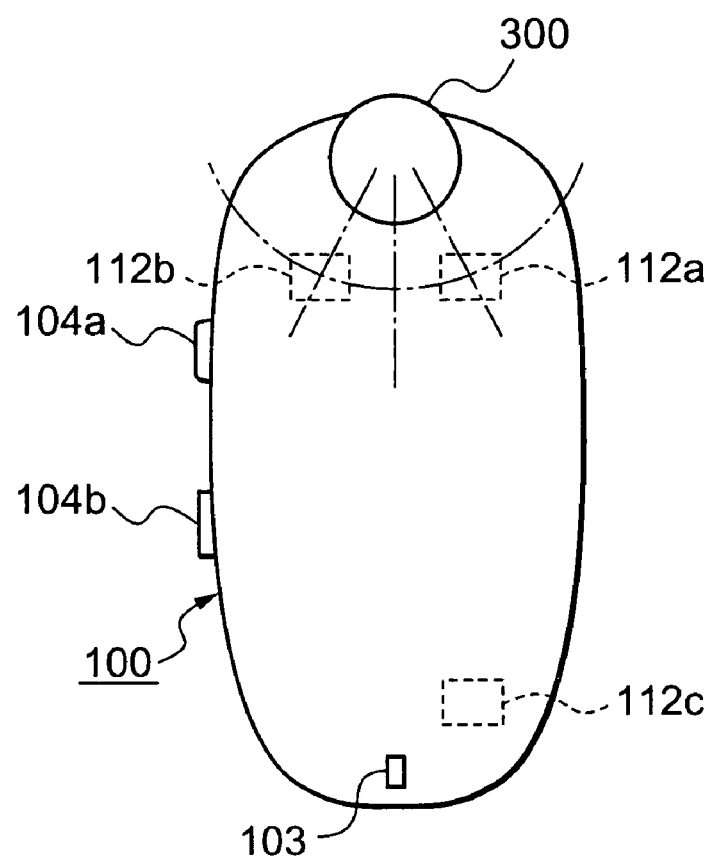
FIGS. 3(a) and 3(b) show an example of the attitude detection mechanism of the upper unit according to an embodiment of the present invention.
Figure 3B:
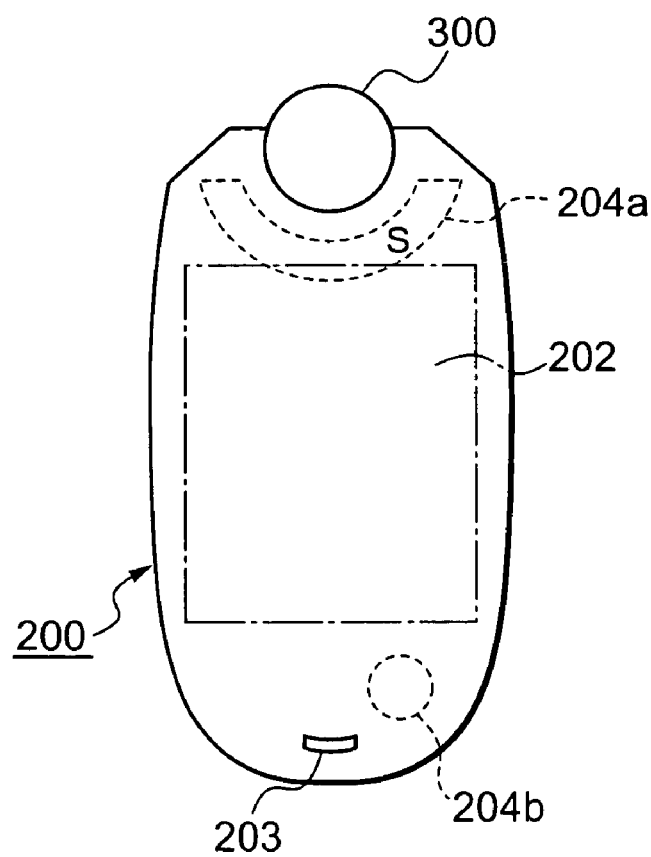

FIGS. 3(a) and 3(b) show an example of the attitude detection mechanism of the upper unit according to an embodiment of the present invention. FIG. 3(a) shows the arrangement of a magnetic sensor provided in the lower unit 100. FIG. 3(b) shows the arrangement of the magnet provided in the upper unit 200.

As shown in FIG. 3(a), magnetic sensors 112a and 112b are arranged at predetermined intervals on the circumference of the lower unit 100 around the hinge 300. Near the microphone 103 of the lower unit 100, a magnetic sensor 112c is arranged. According to the present embodiment, a hall device is used as an example of the magnetic sensors 112a to 112c because the Hall device allows not only the presence/absence but also the direction of a magnetic field to be detected.

As shown in FIG. 3(b), a magnet 204a is embedded in the upper unit 200 in the position corresponding to the arc passing through the magnetic sensors 112a and 112b of the lower unit 100. The south pole of the magnet 204a faces the back, and its north pole faces the display 202. Additionally, a magnet 204b is provided for the upper unit 200 in the position corresponding to the magnetic sensor 112c of the lower unit 100.

Figure 4:
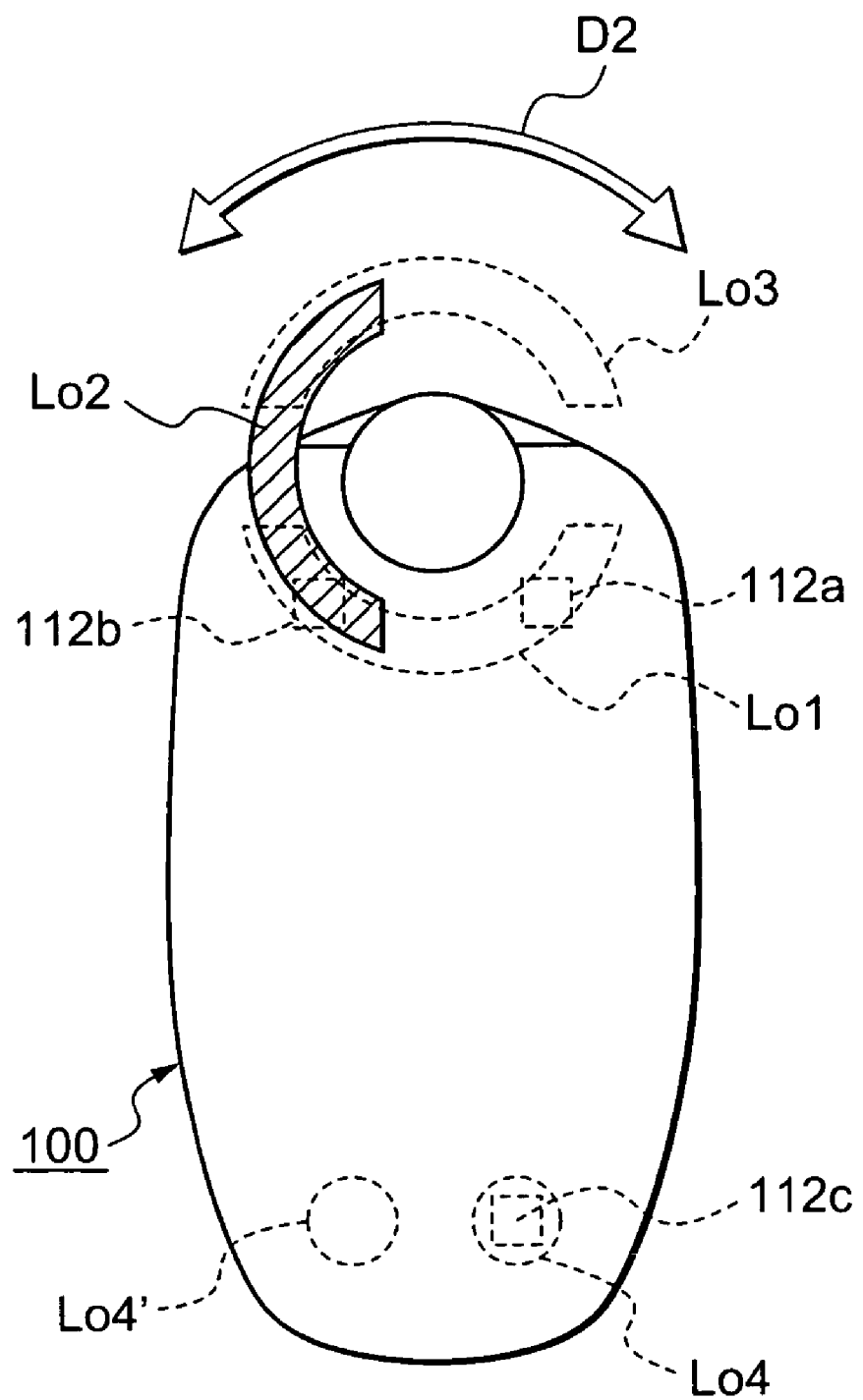
FIG. 4 is a schematic diagram showing the relative position of the sensor and the magnet when the upper unit 200 turns in the arrow D2 direction.

FIG. 4 is a schematic diagram showing the relative position of the sensor and the magnet when the upper unit 200 turns in the arrow D2 direction. In FIG. 4, the positions Lo1 and Lo4 indicate the respective positions of the magnets 204a and 204b in the closed state as shown in FIG. 1(b). In this state, the magnetic sensors 112a to 112c all detect the magnetic fields, and the magnetic sensors 112a and 112b detect the north pole. Therefore, based on the detection results of the magnetic sensors, the closed state of the upper unit 200 with the display 202 enclosed can be detected.

When the upper unit 200 is turned from the closed state in the direction indicated by the arrow D2, the magnet 204a moves to, for example, the position Lo2. In this state, the magnetic sensor 112b still detects the magnetic field of the north pole, but other magnetic sensors 112a and 112c stop detecting magnetic fields at all. Therefore, based on the detection result of the magnetic sensors, the 90° counterclockwise turn of the upper unit 200 can be detected.

When the upper unit 200 is opened as shown in FIG. 1(a) from the closed state as shown in FIG. 1(b), the magnet 204b is separated from the magnetic sensor 112c, and the magnet 204a moves to the position Lo3. Therefore, all the magnetic sensors 112a to 112c stop detecting magnetic fields. Based on the detection result of the magnetic sensors, the open state of the upper unit 200 can be detected.

Furthermore, as shown in FIG. 1(c), since the upper unit 200 is inverted in the closed state with the main surface 201a of the upper unit 200 facing outside, the magnetic sensors 112a and 112b detect the south pole while the magnetic sensor 112c does not detect a magnetic field because the magnet 204b is positioned on the opposite side. Therefore, based on the detection results of the magnetic sensors, the closed state of the upper unit 200 with the main surface 201a facing outside can be detected.

Thus, by monitoring the output (detection result) of the magnetic sensors 112a to 112c, the attitude of the upper unit 200 relative to the lower unit 100 can be determined. The circuit for determination of the attitude is provided inside the mobile telephone as described below.

Figure 5:
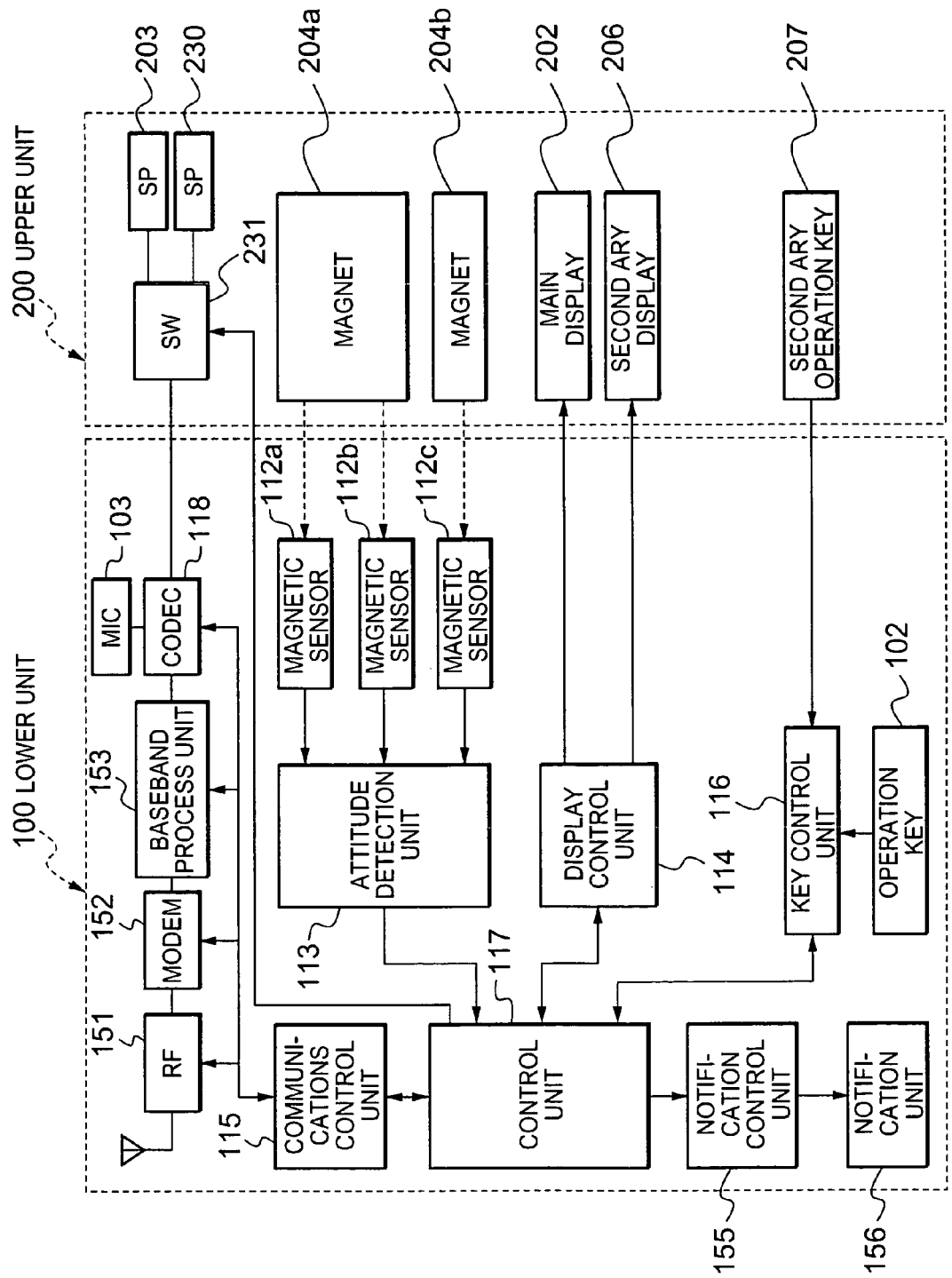
FIG. 5 is a block diagram of the configuration of the electric circuit in the mobile telephone according to the first embodiment of the present invention.

FIG. 5 is a block diagram of the configuration of the electric circuit in the mobile telephone according to the first embodiment of the present invention. In FIG. 5, the same components also shown in FIG. 1 are assigned the same reference numerals.

In FIG. 5, the lower unit 100 comprises the above-mentioned components of the apparatus, that is, the key operation unit 102, the magnetic sensors 112a to 112c, and a circuit block described below.

Each output of the magnetic sensors 112a to 112c is input to the attitude detection unit 113. The attitude detection unit 113 detects the position (attitude) relative to the lower unit 100 of the upper unit 200 as described above (for example, refer to the attitude as shown in FIGS. 1(a) to 1(c)).

The detected attitude is announces to the control unit 117 of the mobile telephone. Thus, the control unit 117 can control the switch of the modes of the mobile telephone, the selection of a receiver (speaker), etc. depending on the attitude of the upper unit 200 (as described later in detail). The control unit 117 performs the entire control such as the control of call reception, the control of communications, etc. of a mobile telephone. Practically, the control unit 117 forms a process module configured by the CPU (central processing unit) not shown in the attached drawings, memory, a software program, etc. used in the CPU, etc.

A display control unit 114 display controls the main display 202 and the secondary display 206 provided on the upper unit 200 in the controlling process performed by the control unit 117.

A key control unit 116 input controls the key operation unit 102 and the secondary operation key 207. The key control unit 116 can also change the function assignment to an operation key under the control of the control unit 117. For example, depending on the operation change by a user, the secondary operation key 207 is assigned any of the call reception response operating function and the call issue operation function can be assigned to the secondary operation key 207, thereby a reply to an incoming call or an issue of a call can be made in the closed state of the units as shown in FIG. 1(c).

The function of changing an assigned function of the operation key can be realized in other embodiments described later.

In FIG. 5, the voice communications using a mobile telephone can be performed by a communications control unit 115 controlling a radio unit (RF) 151, a MODEM 152, a baseband process unit 153, a voice CODEC 118. The voice CODEC 118 codes a transmission voice signal converted into an electric signal using the microphone (MIC: transmitter) 103, outputs it to a baseband process unit 153. The voice CODEC 118 also outputs a received voice signal generated by decoding the received voice data output by the baseband process unit 153 to a selection switch 231 of the upper unit 200.

Furthermore, as shown in FIG. 5, a notification control unit 155 controls the operation of a notification unit 156 under the control of the control unit 117 so that, for example, the operation state of the mobile telephone such as receiving a call, etc. can be announced to the user by voice and/or optical procedure.

According to the present embodiment, the voice communications and the processing operations for announcement of an operation state can be performed using a common configuration. Therefore, the detailed explanation is omitted here.

The selection switch 231 selects the first speaker (SP: receiver) 203 or the second speaker (SP: receiver) 230 under the control of the control unit 117. The received voice signal output from the voice CODEC 118 is converted into voice by being output to any selected speaker.

Practically, in the open state as shown in FIG. 1(a), the first speaker 203 is selected to use the first speaker 203 as a receiver while using the microphone 103 as a transmitter, thereby holding a conversation.

On the other hand, in the closed state with the main surface 201a facing outside as shown in FIG. 1(c), the second speaker 230 is selected to use the second speaker 230 as a receiver while using the microphone 103 as a transmitter, thereby holding a conversation. The selection switch (SW) 231 can also be mounted on the lower unit 100.

The process performed by the control unit 117 to realize the above-mentioned switching operation of a receiver and a transmitter is described later by referring to FIGS. 12(a) and 12(b).

As described above, in the present embodiment, depending on the attitude, which is detected by the attitude detection unit 113, of the upper unit 200 relative to the lower unit 100, the first speaker 203 or the second speaker 230 is selected as a receiver.

Therefore, using the mobile telephone according to the above-mentioned embodiment of the present invention, the user can immediately reply to a call without opening or turning the mobile telephone although it is in the closed state with the main surface 201a facing outside as shown in FIG. 1(c). Additionally, the user can easily issue a call by operating the secondary operation key 207 although he or she is issuing the call in the state. In addition, even during the conversation, a receiver can be appropriately and automatically selected depending on the attitude when the user changes the attitude of the upper unit 200 under the control of the control unit 117.

In the above-mentioned embodiment of the present invention, in the open state of the lower unit 100 and the upper unit 200 shown in FIG. 1(a), the first speaker 203 and the microphone 103 are selected as a set (pair) of a transmitter and a receiver, but the second speaker 230 can also be controlled to function as a receiver. In this case, there is the advantage that the conversation voice can be easily caught by the user.

Second Embodiment

FIGS. 6(a) to 6(c) are explanatory views of the configuration and the operation of the folding mobile telephone according to the second embodiment of the present invention.

That is, FIG. 6(a) is a plan view of the upper unit in the open state. FIG. 6(b) is a plan view of the mobile telephone with the display facing inside in the closed state. FIG. 6(c) is a plan view from the display with the display facing outside in the closed state.

Figure 6:
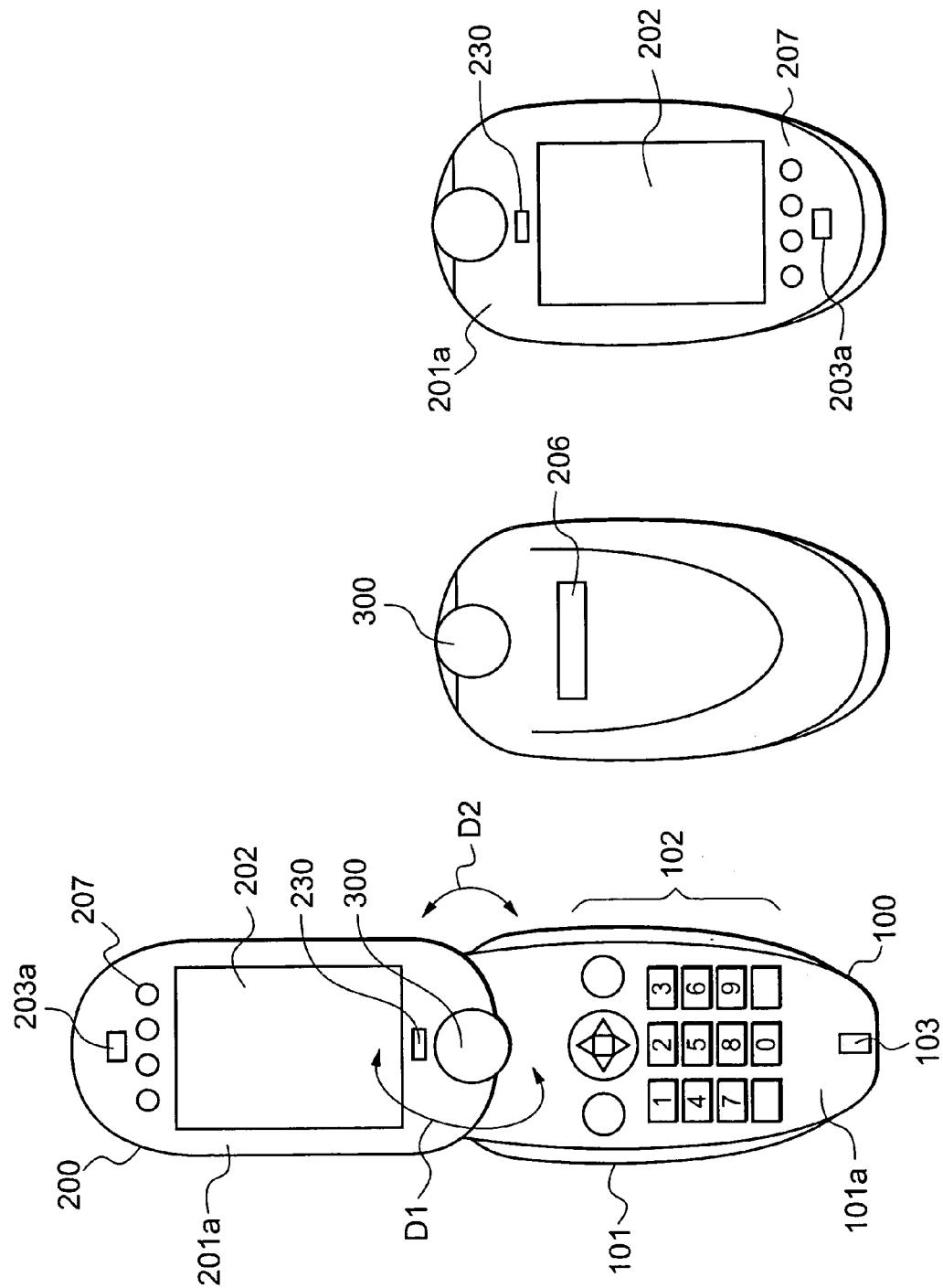
FIGS. 6(a) to 6(c) are explanatory views of the configuration and the operation of the folding mobile telephone according to the second embodiment of the present invention. That is.

In FIG. 6, the same component also described in the first embodiment as shown in FIG. 1 is assigned the same reference numeral, and the explanation is omitted here.

As shown in FIGS. 6(a) to 6(c), the folding mobile telephone according to the present embodiment is mainly configured by the lower unit 100 (second housing), the upper unit 200 (first housing), and the 2-axis hinge 300 for connection of the units. The hinge 300 has the structure shown in FIG. 2 as in the first embodiment. The hinge 300 allows the upper unit 200 to be opened, closed and turned relative to the lower unit 100.

The lower unit 100 comprises the key operation unit 102 including the ten keys and the microphone (transmitter) 103 on the main surface 101a. On the main surface 201a of the upper unit 200, the speaker/microphone (transmitter/receiver) 203a and the secondary operation key 207 are provided above the display 202 at the upper portion of the main surface 201a. At the lower portion of the main surface 201a, the speaker (receiver) 230 is provided. As the speaker/microphone 203a, for example, the technology of the electric signal oscillation converter for a speaker and microphone described in the Patent Document 2 above in the BACKGROUND OF THE INVENTION can be used.

When the upper unit 200 is opened from the closed state as shown in FIG. 6(b) (that is, the display 202 is enclosed by the folded units 100 and 200) in the direction indicated by the arrow D1 as shown in FIG. 6(a), the key operation unit 102, the display 202, the microphone 103, the speaker/microphone 203a, and the speaker 230 are exposed. In this state, the user can perform a key operation such as dialing, data input, etc. and a conversation.

By turning the upper unit 200 from the open state shown in FIG. 6(a) in the direction indicated by the arrow D2, the upper unit 200 can be laid on the lower unit 100 in the closed state with the main surface 201a facing outside as shown in FIG. 6(c).

In this closed state (that is, the main surface 201a of the upper unit 200 is exposed outside, and the main surface 101a of the lower unit 100 is substantially completely hidden from view by the folded units 100 and 200), the speaker/microphone 203a and the speaker 230 as well as the display 202 are exposed outside. As described later, in the closed state, the speaker 230 is controlled to function as a receiver, and the speaker/microphone 203a is controlled to function as a transmitter.

In the mobile telephone according to the present embodiment, as in the first embodiment, an attitude detection mechanism described above by referring to FIG. 3 is also provided so that the attitude of the upper unit 200 can be detected.

Figure 7:
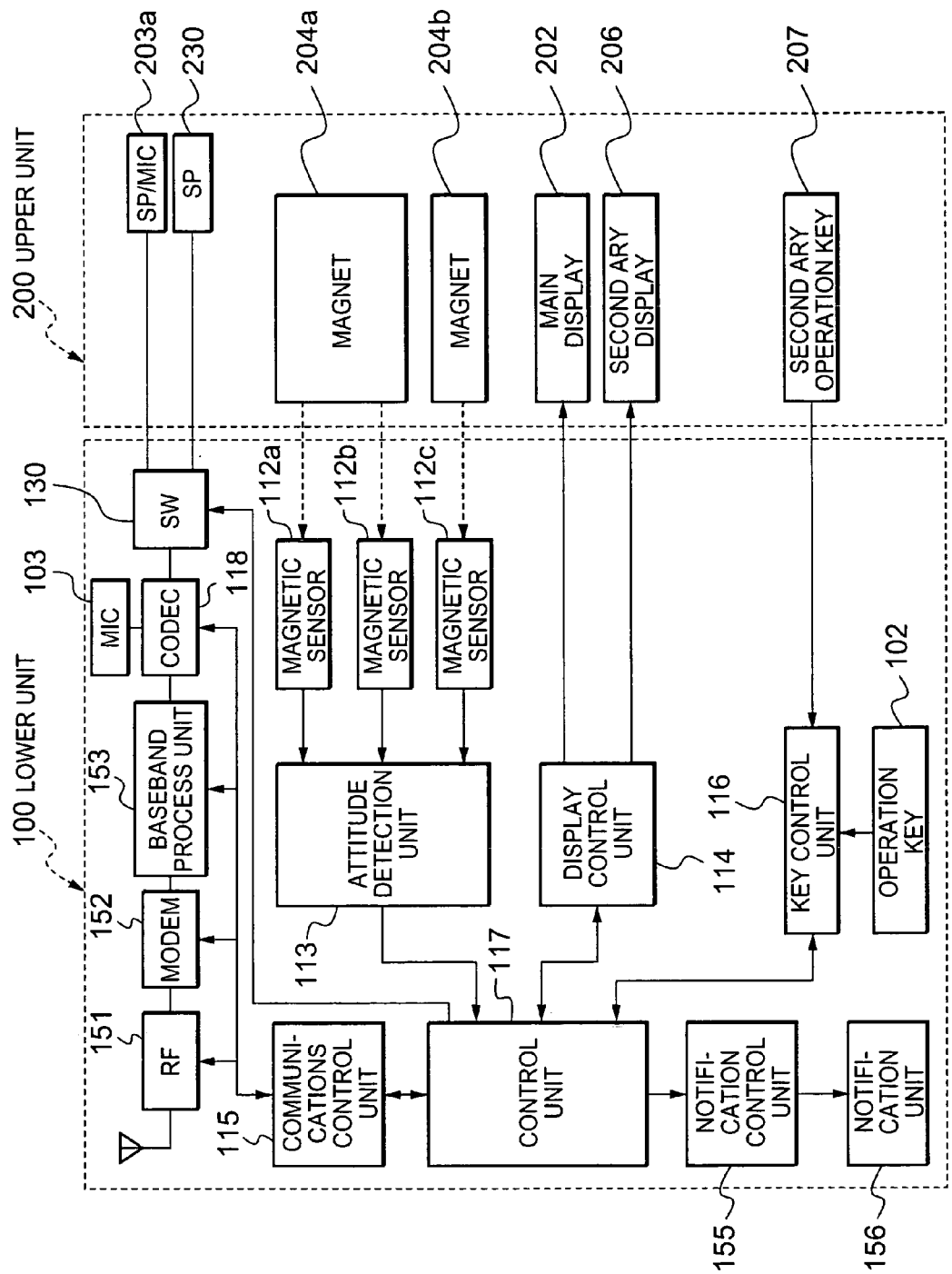
FIG. 7 is a block diagram of the configuration of the electric circuit in the mobile telephone according to the second embodiment of the present invention.

FIG. 7 is a block diagram of the configuration of the electric circuit in the mobile telephone according to the second embodiment of the present invention. In FIG. 7, the same component also shown in FIG. 5 is assigned the same reference numeral, and the explanation is omitted here.

In FIG. 7, the lower unit 100 comprises the microphone 103 and a selection switch (SW) 130 connected to the voice CODEC 118.

The selection switch 130 selects any of the speaker/microphone 203a and the speaker 230 under the control of the control unit 117, and outputs the received voice signal output from the voice CODEC 118 to the selected speaker/microphone 203a or speaker 230.

Practically, in the open state as shown in FIG. 6(a), the speaker/microphone 203a is selected to use the speaker/microphone 203a as a speaker (receiver) while using the microphone 103 as a transmitter, thereby holding a conversation.

On the other hand, in the closed state with the main surface 201a facing outside as shown in FIG. 6(c), the speaker 230 is selected to use the speaker 230 as a receiver while using the microphone 103 as a transmitter, thereby holding a conversation.

The selection switch 130 can also be mounted on the upper unit 200.

As described above, depending on the attitude of the upper unit 200 detected by the attitude detection unit 113, an appropriate transmitter and receiver can be selected from among the microphone 103, the speaker/microphone 203a, and the speaker 230. Therefore, the user can immediately reply to a call without opening or turning the mobile telephone although it is in the closed state with the main surface 201a facing outside as shown in FIG. 6(c). Additionally, the user can easily issue a call by operating the secondary operation key 207 although he or she is issuing the call in the state. In addition, even during the conversation, a receiver can be appropriately and automatically selected depending on the attitude when the user changes the attitude of the upper unit 200 under the control by the control unit 117.

The process performed by the control unit 117 to realize the above-mentioned switching operation of a receiver and a transmitter is described later by referring to FIGS. 12(a) and 12(b).

In the above-mentioned embodiment of the present invention, in the open state of the lower unit 100 and the upper unit 200 shown in FIG. 6(a), the speaker/microphone 203a is used as a receiver and the microphone 103 is used as a transmitter as a set (pair) of a transmitter and a receiver, but the speaker 230 can also be controlled to function as a receiver. In this case, there is the advantage that the conversation voice can be easily caught by the user.

Third Embodiment

FIGS. 8(a) to 8(c) are explanatory views of the configuration and the operation of the folding mobile telephone according to the third embodiment of the present invention.

That is, FIG. 8(a) is a plan view of the upper unit in the open state. FIG. 8(b) is a plan view of the mobile telephone with the display facing inside in the closed state. FIG. 8(c) is a plan view from the display with the display facing outside in the closed state.

In the present embodiment, the same component also described in the first embodiment as shown in FIG. 1 is assigned the same reference numeral, and the explanation is omitted here.

As shown in FIGS. 8(a) to 8(c), the folding mobile telephone according to the present embodiment is mainly configured by the lower unit 100 (second housing), the upper unit 200 (first housing), and the 2-axis hinge 300 for connection of the units. Also in the present embodiment, the hinge 300 has the structure shown in FIG. 2 as in the first embodiment. The hinge 300 allows the upper unit 200 to be opened, closed and turned relative to the lower unit 100.

On the main surface 201a of the upper unit 200 according to the present embodiment, the speaker/microphone (transmitter/receiver) 240 and the operation key 207 are provided above the display 202 at the upper portion of the main surface 201a. At the lower portion of the main surface 201a, the speaker/microphone (transmitter/receiver) 241 is provided. As the speaker/microphone 240 and 241, for example, the technology of the electric signal oscillation converter for a speaker and microphone described in the Patent Document 2 above can be used.

When the upper unit 200 is opened from the closed state as shown in FIG. 8(b) (that is, the display 202 is enclosed by the folded units 100 and 200) in the direction indicated by the arrow D1 as shown in FIG. 8(a), the key operation unit 102, the display 202, and the speaker/microphones 240 and 241 are exposed. In this state in which the two units 100 and 200 are in the open state, the user can perform a key operation such as dialing, data input, etc. and a conversation.

By turning the upper unit 200 from the open state shown in FIG. 8(a) in the direction indicated by the arrow D2, the upper unit 200 can be laid on the lower unit 100 in the closed state with the main surface 201a facing outside as shown in FIG. 8(c).

In this closed state (that is, the main surface 201a of the upper unit 200 is exposed outside, and the main surface 101a of the lower unit 100 is substantially completely hidden from view by the folded units 100 and 200), the speaker/microphones 240 and 241 as well as the display 202 are exposed outside. As described later, in the closed state, the speaker/microphone 241 is controlled to function as a receiver, and the speaker/microphone 240 is controlled to function as a transmitter.

In the mobile telephone according to the present embodiment, as in the first embodiment, an attitude detection mechanism described above by referring to FIG. 3 is also provided so that the attitude of the upper unit 200 can be detected.

Figure 9:
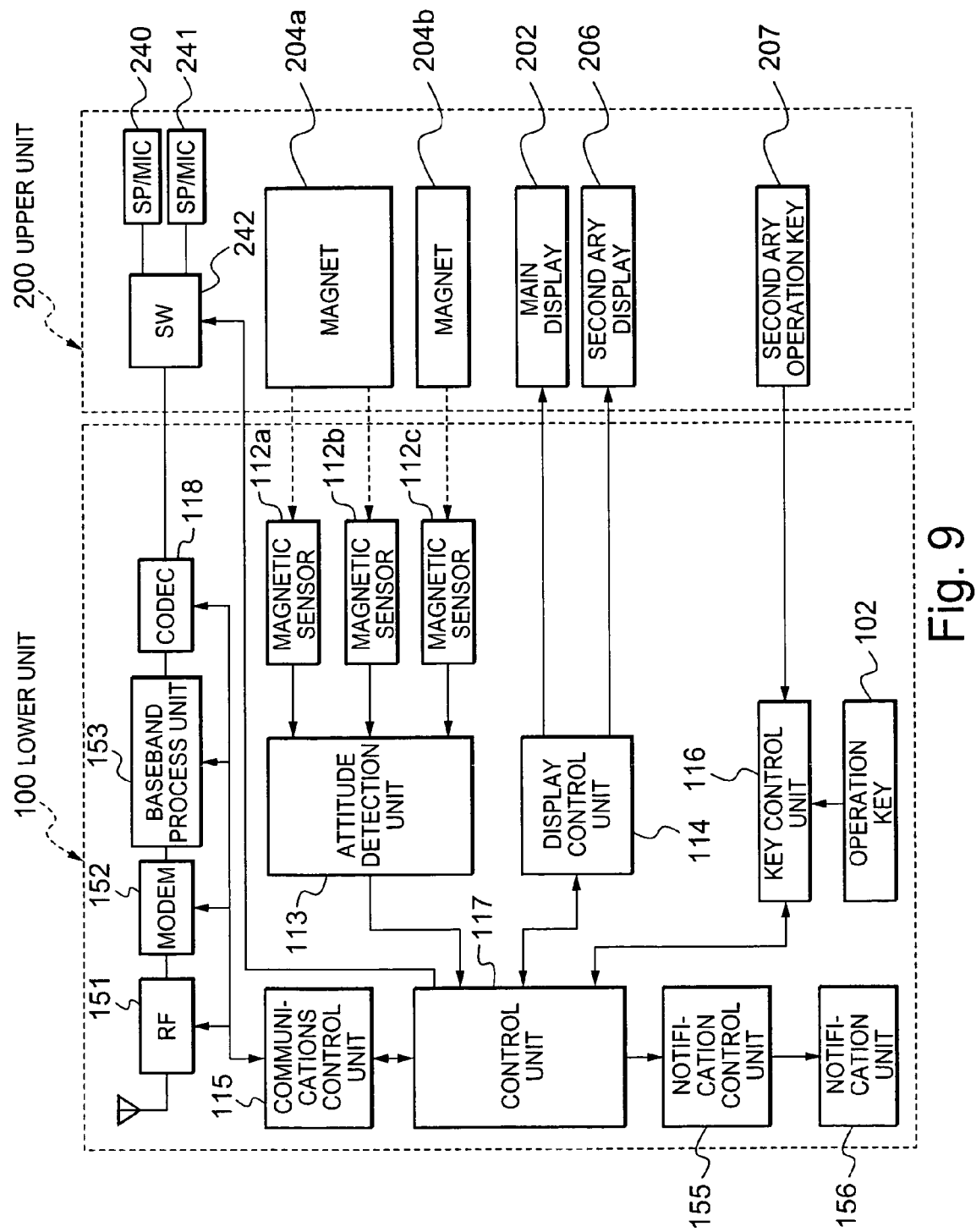
FIG. 9 is a block diagram of the configuration of the electric circuit in the mobile telephone according to the third embodiment of the present invention.

FIG. 9 is a block diagram of the configuration of the electric circuit in the mobile telephone according to the third embodiment of the present invention. In FIG. 9, the same component also shown in FIG. 5 can be assigned the same reference numeral, and the explanation is omitted here.

In FIG. 9, the upper unit 200 comprises a selection switch (SW) 242 connected to the voice CODEC 118 and the speaker/microphones 240 and 241 connected to the selection switch.

The selection switch 242 selects the speaker/microphone 240 or 241 under the control of the control unit 117, and outputs the received voice signal output from the voice CODEC 118 to the selected speaker/microphone 240 or 241.

Practically, in the open state as shown in FIG. 8(a), the speaker/microphone 240 is selected to use the speaker/microphone 240 as a speaker (receiver) while using the speaker/microphone 241 as a transmitter, thereby holding a conversation.

On the other hand, in the closed state with the main surface 201a facing outside as shown in FIG. 8(c), the speaker/microphone 241 is selected to use the speaker/microphone 241 as a receiver while using the speaker/microphone 240 as a transmitter, thereby holding a conversation. The selection switch 242 can also be mounted on the lower unit 100.

The process performed by the control unit 117 to realize the above-mentioned switching operation of a receiver and a transmitter is described later by referring to FIGS. 12(a) and 12(b).

As described above, depending on the attitude of the upper unit 200 detected by the attitude detection unit 113, a transmitter and receiver can be selected from between speaker/microphones 240 and 241. Therefore, the user can immediately reply to a call without opening or turning the mobile telephone although it is in the closed state with the main surface 201a facing outside as shown in FIG. 8(c). Additionally, the user can easily issue a call by operating the secondary operation unit 207 although he or she is issuing the call in the state. In addition, even during the conversation, a receiver can be appropriately and automatically selected depending on the attitude when the user changes the attitude of the upper unit 200 under the control of the control unit 117.

Fourth Embodiment

FIGS. 10(a) to 10(c) are explanatory views of the configuration and the operation of the folding mobile telephone according to the fourth embodiment of the present invention.

That is, FIG. 10(a) is a plan view of the upper unit in the open state. FIG. 10(b) is a plan view of the mobile telephone with the display facing inside in the closed state. FIG. 10(c) is a plan view from the display with the display facing outside in the closed state.

In the present embodiment, the same component also described in the first embodiment as shown in FIG. 1 is assigned the same reference numeral, and the explanation is omitted here.

As shown in FIGS. 10(a) to 10(c), the folding mobile telephone according to the present embodiment is mainly configured by the lower unit 100 (second housing), the upper unit 200 (first housing), and the 2-axis hinge 300 for connection of the units. Also in the present embodiment, the hinge 300 has the structure shown in FIG. 2 as in the first embodiment. The hinge 300 allows the upper unit 200 to be opened, closed and turned relative to the lower unit 100.

The lower unit 100 comprises the key operation unit 102 including the ten keys and the microphone 103 on the main surface 101a. On the main surface 201a of the upper unit 200, the speaker/microphone (transmitter/receiver) 203b and the secondary operation key 207 are provided at the upper portion of the main surface 201a. As the speaker/microphone 203b, for example, the technology of the electric signal oscillation converter for a speaker and microphone described in the Patent Document 2 above can be used.

Furthermore, in the present embodiment, the speaker 330 is provided on the hinge 300. The structure of the hinge 300 is as shown in FIG. 3. In addition, in the present embodiment, a cylindrical case is attached at the tip of the rotation axis 301 so that the speaker 330 can be incorporated into the case.

For a practical example of the cylindrical case, the technology described in Japanese Patent Application No. 2002-096313 filed on May 29, 2002 can be used. That is, the technology described in the specifications is also included in the present specifications.

Figure 10:
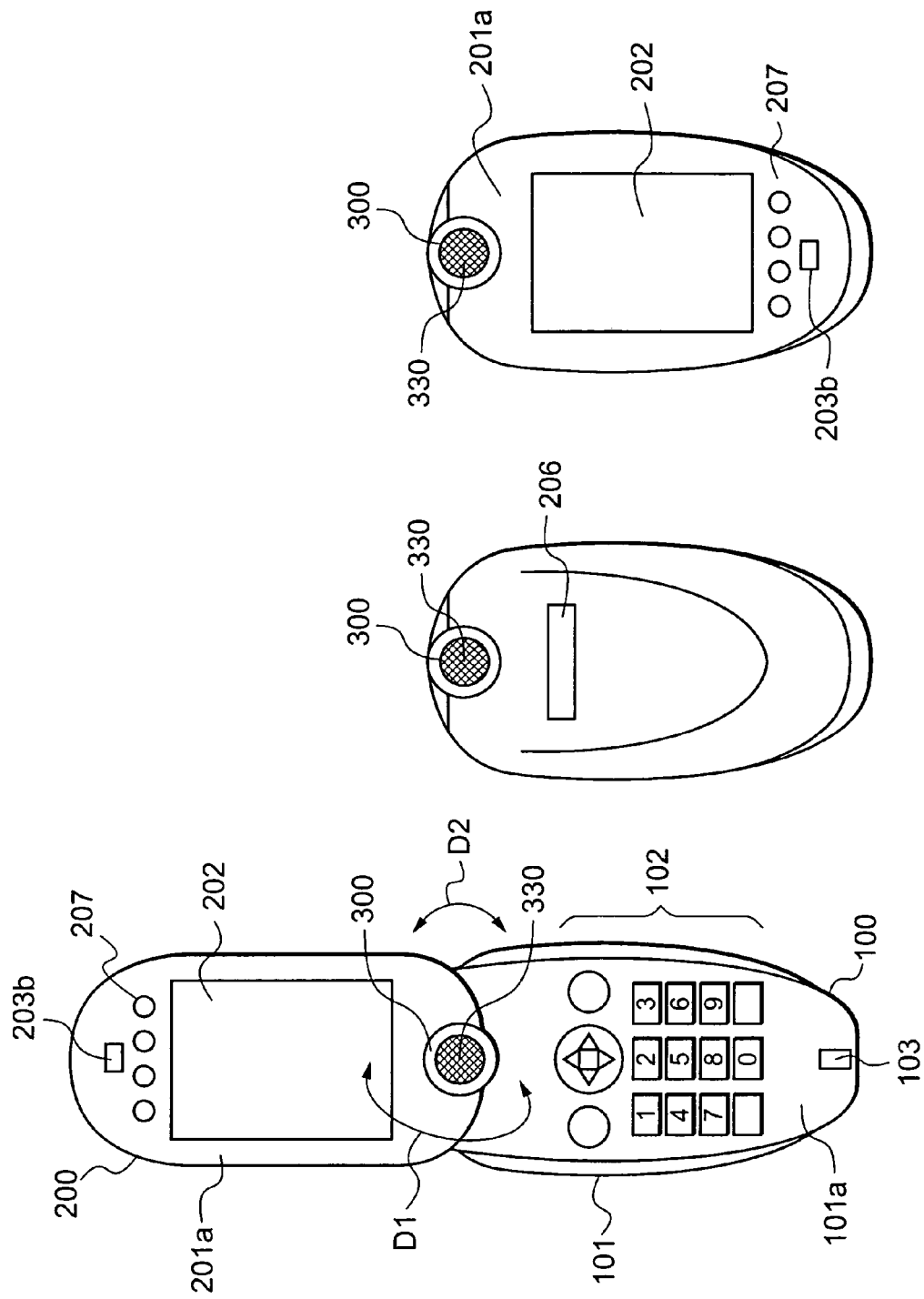
FIGS. 10(a) to 10(c) are explanatory views of the configuration and the operation of the folding mobile telephone according to the fourth embodiment of the present invention. That is.

When the upper unit 200 is opened from the closed state as shown in FIG. 10(*b*) (that is, the display 202 is enclosed by the folded units 100 and 200) in the direction indicated by the arrow D1 as shown in FIG. 10(*a*), the key operation unit 102, the display 202, the microphone 103, and the speaker/microphone 203*b* are exposed. In this state in which the two units 100 and 200 are in the open state, the user can perform a key operation such as dialing, data input, etc. and a conversation.

By turning the upper unit 200 from the open state shown in FIG. 10(*a*) in the direction indicated by the arrow D2, the upper unit 200 can be laid on the lower unit 100 in the closed state with the main surface 201*a* facing outside as shown in FIG. 10(*c*).

In this closed state (that is, the main surface 201*a* of the upper unit 200 is exposed outside, and the main surface 101*a* of the lower unit 100 is substantially completely hidden from view by the folded units 100 and 200), the speaker/microphone 203*b* as well as the display 202 are exposed outside. As described later, in the closed state, the speaker 330 of the hinge 300 is controlled to function as a receiver, and the speaker/microphone 203*b* is controlled to function as a transmitter.

In the mobile telephone according to the present embodiment, as in the first embodiment, an attitude detection mechanism described above by referring to FIG. 3 is also provided so that the attitude of the upper unit 200 can be detected.

Figure 11:
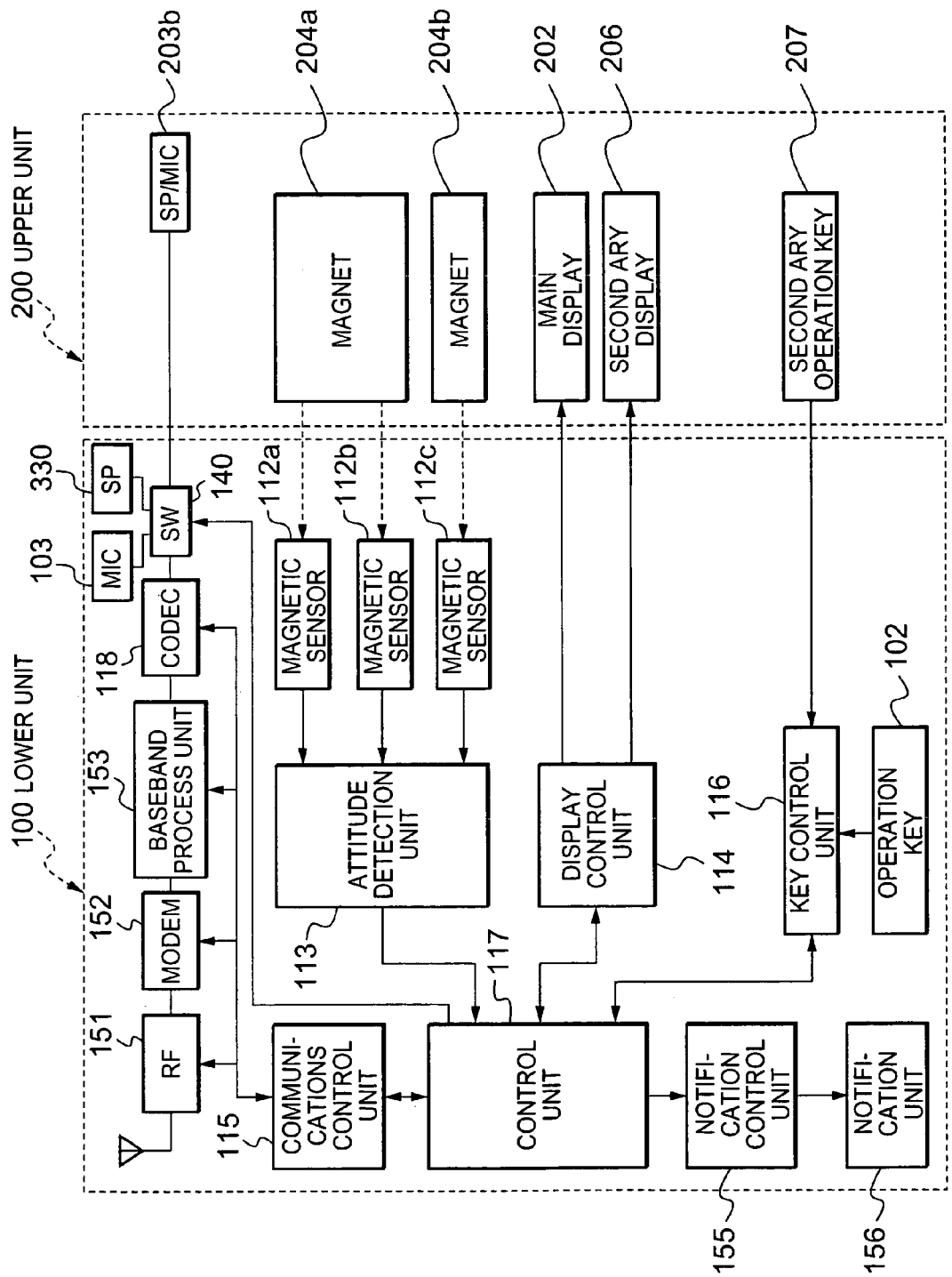
FIG. 11 is a block diagram of the configuration of the electric circuit in the mobile telephone according to the fourth embodiment of the present invention.

FIG. 11 is a block diagram of the configuration of the electric circuit in the mobile telephone according to the fourth embodiment of the present invention. In FIG. 11, like reference numbers refer to the same circuit block as in FIG. 5 and description is omitted.

In FIG. 11, the lower unit 100 comprises a selection switch (SW) 140 connected to the voice CODEC 118 and the microphone 103 and the speaker 330 connected to the selection switch 140. The speaker/microphone 203*b* provided for the upper unit 200 is also connected to the selection switch 140.

The selection switch 140 selects a pair of a transmitter and a receiver required for a conversation from among the microphone 103, the speaker 330, and the speaker/microphone 203*b* under the control of the control unit 117.

Practically, in the open state as shown in FIG. 10(*a*), the speaker/microphone 203*b* and the microphone 103 are selected to use the speaker/microphone 203*b* as a speaker (receiver) while using the microphone 103 as a transmitter, thereby holding a conversation.

On the other hand, in the closed state with the main surface 201*a* facing outside as shown in FIG. 10(*c*), the speaker 330 and the speaker/microphone 203*b* are selected to use the speaker 330 as a receiver while using the speaker/microphone 203*b* as a transmitter, thereby holding a conversation.

The process performed by the control unit 117 to realize the above-mentioned switching operation of a receiver and a transmitter is described later by referring to FIGS. 12(*a*) and 12(*b*).

In the present embodiment as described above, depending on the attitude of the upper unit 200 detected by the attitude detection unit 113, the optimum pair of a transmitter and a receiver can be selected from among the microphone 103, the speaker 330, and the speaker/microphone 203*b*. Therefore, the user can immediately reply to a call without opening or turning the mobile telephone although it is in the closed state with the main surface 201*a* facing outside as shown in FIG. 10(*c*). Additionally, the user can easily issue a call by operating the secondary operation key 207 although he or she is issuing the call in the state. In addition, even during the conversation, a receiver can be appropriately and automatically selected depending on the attitude when the user changes the attitude of the upper unit 200 under the control by the control unit 117.

In the above-mentioned embodiment of the present invention, in the open state of the lower unit 100 and the upper unit 200 shown in FIG. 10(*a*), the speaker/microphone 203*b* is used as a receiver and the microphone 103 is used as a transmitter as a set (pair) of a transmitter and a receiver, but the speaker 330 can also be controlled to function as a receiver. In this case, there is the advantage that the conversation voice can be easily caught by the user.

The assignment of a function to a receiver and a transmitter in the above-mentioned first to fourth embodiment is collectively listed below in Table 1 (in which the state (1) indicates the closed state of the upper unit 200 and the lower unit 100 with the main surface 201*a* exposed outside).

TABLE 1

Figure 8:
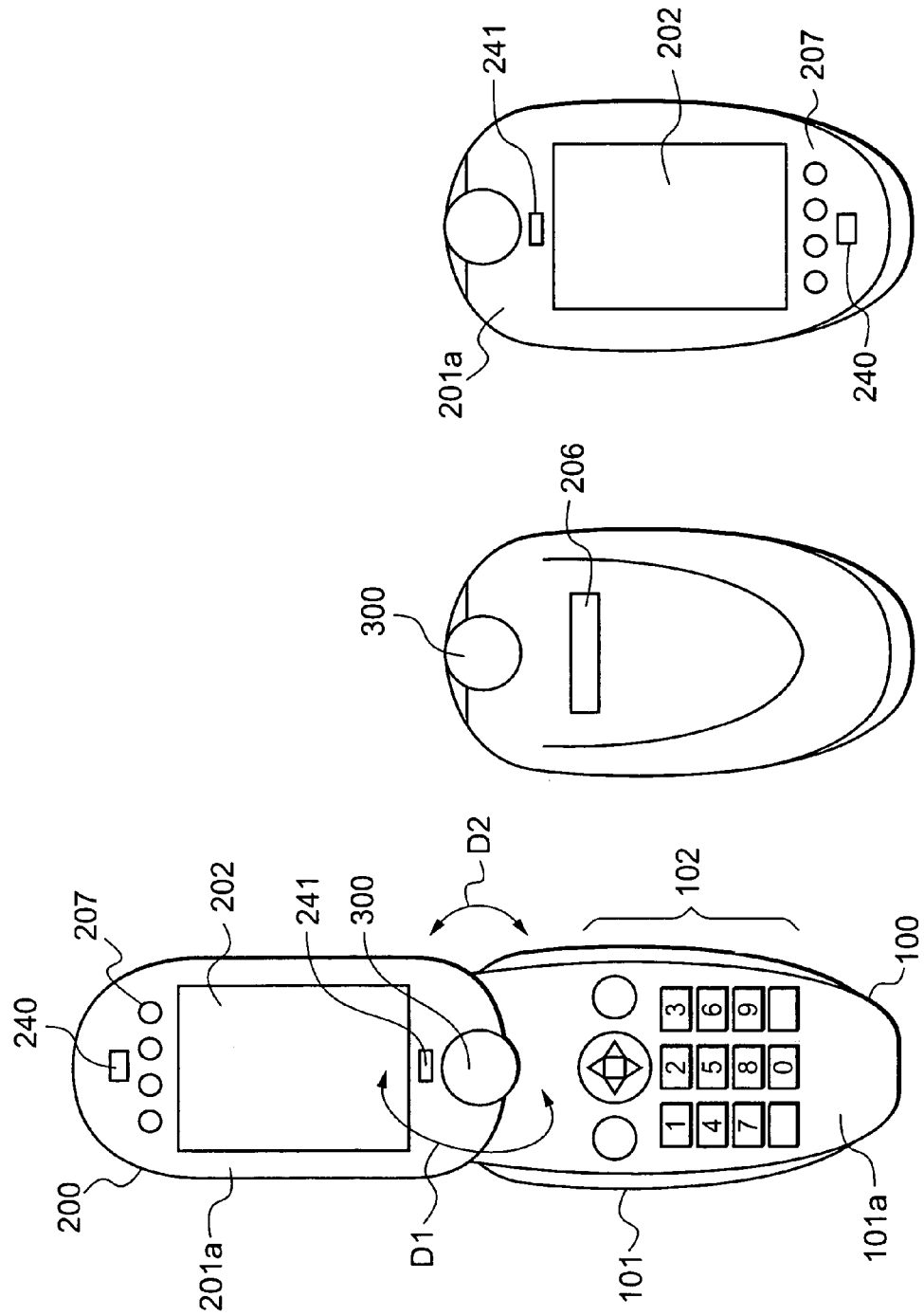
FIGS. 8(a) to 8(c) are explanatory views of the configuration and the operation of the folding mobile telephone according to the third embodiment of the present invention. That is.

| EMBODIMENT | FUNCTION | STATE (1) | STATES OTHER THAN STATE (1) |
|---|---|---|---|
| FIRST (FIGS. 1 (A) TO 1 (C), 5 | RECEIVER | SECOND SPEAKER 230 | FIRST SPEAKER 203 |
| | TRANSMITTER | MICROPHONE 103 | MICROPHONE 103 |
| SECOND (FIGS. 6 (A) TO 6 (C), 7) | RECEIVER | SECOND SPEAKER 230 | SPEAKER/ MICROPHONE 203a |
| | TRANSMITTER | SPEAKER/ MICROPHONE 203a | MICROPHONE 103 |
| THIRD (FIGS. 8 (A) TO 8 (C), 9) | RECEIVER | SPEAKER/ MICROPHONE 241 | SPEAKER/ MICROPHONE 240 |
| | TRANSMITTER | SPEAKER/ MICROPHONE 240 | SPEAKER/ MICROPHONE 241 |
| FOURTH (FIGS. 10 (A) TO 10 (C), 11) | RECEIVER | SPEAKER 330 | SPEAKER/ MICROPHONE 203b |

TABLE 1-continued

| EMBODIMENT | FUNCTION | STATE (1) | STATES OTHER THAN STATE (1) |
|---|---|---|---|
| | TRANSMITTER | SPEAKER/ MICROPHONE 203b | MICROPHONE 103 |

<Controlling Operation Process When a Call is Issued and Received>

Figure 12B:
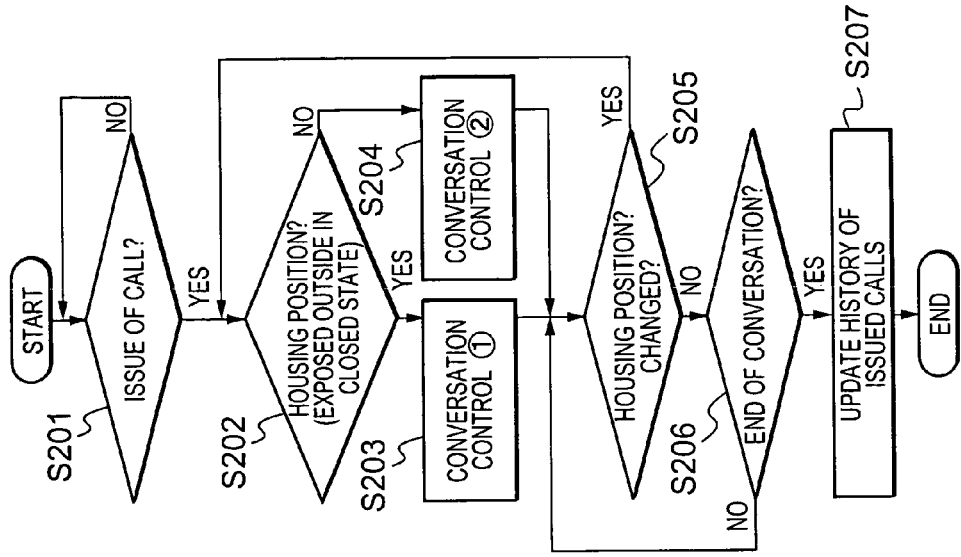
FIG. 12(b) is a flowchart of the controlling operation process when a call is issued by a mobile telephone according to each embodiment of the present invention.
Figure 12A:
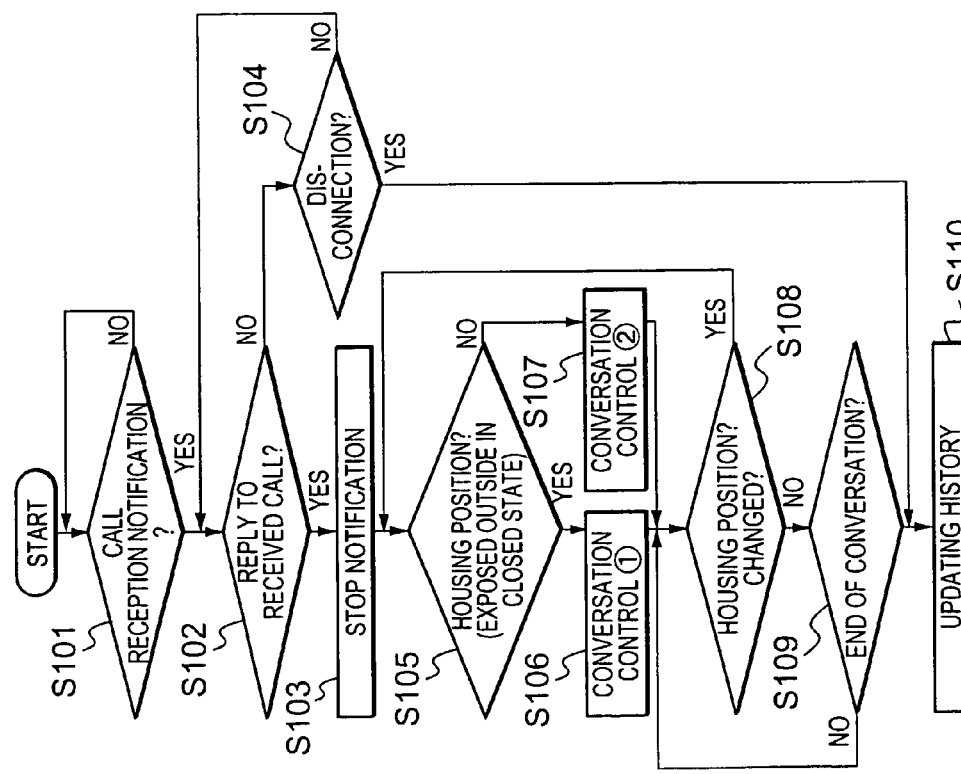
FIG. 12(a) is a flowchart of the controlling operation process when a call is received by a mobile telephone according to each embodiment of the present invention.

FIG. 12(a) is a flowchart of the controlling operation process when a call is received by a mobile telephone according to each embodiment of the present invention. FIG. 12(b) is a flowchart of the controlling operation process when a call is issued by a mobile telephone according to each embodiment of the present invention.

The flowcharts shown in FIGS. 12(a) and 12(b) show the procedures of the software program executed by the CPU (not shown in the attached drawings) of the control unit 117.

In FIG. 12(a), when the reception of a call is detected by the communications control unit 115 (YES in step S101), the control unit 117 controls the notification control unit 155 to notify a user of the reception using voice or optical means.

When the reply of the user operating the key operation unit 102 or the secondary operation unit 207 in response to the reception of a call is detected by the key control unit 116 (YES in step S102), the control unit 117 controls the notification control unit 155 to stop the notification (step S103). Then, the control unit 117 determines the attitude (relative position between the lower unit 100 and the upper unit 200) the moment the attitude detection unit 113 detects the attitude (step S105).

As shown in FIG. 1(c), 6(c), 8(c), or 10(c), when the units are closed with the main surface 201a exposed outside (YES in step S105), a conversation is controlled by the assignment (function) of a receiver and a transmitter in each embodiment as shown in the columns of "state (1)" in Table 1 above (step S106)

On the other hand, in the states other than the state in which the units are closed with the main surface 201a exposed outside (NO in step S105), a conversation is controlled by the assignment (function) of a receiver and a transmitter in each embodiment as shown in the columns of "states other than state (1)" in Table 1 above (step S107).

That is, when a call is received, the above-mentioned conversation control continues until the change of the attitude between the upper and lower units 100 and 200 is detected by the attitude detection unit 113, or until the conversation is completed (NO in steps S108 and S109). If a change in attitude is detected between the units during the conversation (YES in step S108), the control unit 117 repeats the processes in steps S105 to S109 depending on the new attitude.

When the conversation is completed (YES in step S109), or when the call is disconnected without a reply to the call in step S102 (YES in step S104), the control unit 117 updates the call reception history stored in the memory not shown in the attached drawings (step S110), thereby terminating the process.

When the user operates the issue key 102 (YES in step S201) as shown in FIG. 12(b), the control unit 117 determines the attitude (relative position between the units 100 and 200) the moment the attitude detection unit 113 detects the attitude (step S202).

As shown in FIG. 1(c), 6(c), 8(c), or 10(c), when the units are closed with the main surface 201a exposed outside (YES in step S202), a conversation is controlled by the assignment (function) of a receiver and a transmitter in each embodiment as shown in the columns of "state (1)" in Table 1 above (step S203).

On the other hand, in the states other than the state in which the units are closed with the main surface 201a exposed outside (NO in step S202), a conversation is controlled by the assignment (function) of a receiver and a transmitter in each embodiment as shown in the columns of "states other than state (1)" in Table 1 above (step S204).

That is, when a call is received, the above-mentioned conversation control continues until the change of the attitude between the upper and lower units 100 and 200 is detected by the attitude detection unit 113, or until the conversation is completed (NO in steps S205 and S206). If a change in attitude is detected between the units during the conversation (YES in step S205), the control unit 117 repeats the processes in steps S202 to S206 depending on the new attitude.

When the conversation is completed (YES in step S206), the control unit 117 updates the call reception history stored in the memory not shown in the attached drawings (step S207), thereby terminating the process.

As described above, each of the above-mentioned embodiments can provide a folding mobile communications apparatus having excellent operability during the telephone conversation regardless of the arrangement status of the housings of the apparatus.

That is, in each of the above described embodiments, the control unit 117 can select an appropriate transmitter and receiver from among a plurality of speakers, microphones, and speaker/microphones depending on the relative position (attitude) between the upper unit 200 and the lower unit 100.

Therefore, although a call is received in the closed state of the units with the main surface 201a of the upper unit 200 facing outside, the user can immediately receive the call without opening or turning the units. In addition, when the user is checking electronic mail, etc. on the display, etc. a call can be issued without changing the current state, thereby greatly enhancing the operability.

Furthermore, even during a conversation, a receiver can be appropriately and automatically selected depending on the attitude when the user changes the attitude of the upper unit 200 under the control by the control unit 117.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A folding mobile communications apparatus having a first housing, a second housing, and a hinge for connecting the first housing and the second housing as rotatable in a open-and-close state, comprising:
- a transmitter/receiver which is provided at an end portion opposite the hinge on a first inner surface of the first housing and has two functions of a receiver and a transmitter, and is able to switch the functions;
- a first microphone which is provided at the hinge and has at least a function of a receiver;
- a second microphone which is provided at another end portion opposite the hinge on a second inner surface of the second housing and has a function of a transmitter;
- a detection unit which detects a relative position between the first housing and the second housing; and
- a control unit which controls a transmitter/receiver and a microphone selected from among said transmitter/receiver, first microphone, and second microphone based on relative positions detected by said detection unit to function as at least one set of a receiver and a transmitter, wherein
- said control unit controls:
- said transmitter/receiver to function as a receiver and said second microphone to function as a transmitter when the first and second inner surfaces are detected, as the relative positions, as being exposed to outside by opening the first and second housings, and
- said first microphone to function as a receiver and said transmitter/receiver to function as a transmitter when the first and second housings are detected, as the relative positions, as being closed such that the first inner surface of the first housing is exposed to the outside and the first inner surface of the second housing is substantially hidden from the outside.

2. A folding mobile communications apparatus having a first housing, a second housing, and a hinge for connecting the first housing and the second housing rotatable in an open-and-close state, comprising:
- a first speaker which is provided at another end portion opposite the hinge on a first inner surface of the first housing and has at least a function of a receiver;
- a second speaker which is provided at the hinge on the first inner surface and has at least the function of a receiver;
- a microphone which is provided at another end portion opposite the hinge on a second inner surface of the second housing and has at least a function of a transmitter;
- a detection unit which detects a relative position between the first housing and the second housing; and
- a control unit which controls speaker and microphone selected from among the first speaker, the second speaker, and the microphone based on a position detected by said detection unit to function as at least a set of a receiver and a transmitter, further comprising an operation unit on the first inner surface of the first housing, wherein:
- said control unit includes a function setting unit for setting a call reception response operating function or a call issue operation function in said operation unit depending on a user setting operation, and
- said operation unit is controlled to function as the call reception response operating function or the call issue operation function whichever is selected when the first and second housings are detected, as the relative positions, as being closed such that the first inner surface of the first housing is exposed to outside and the first inner surface of the second housing is substantially hidden from the outside.

3. A folding mobile communications apparatus having a first housing, a second housing, and a hinge for connecting the first housing and the second housing as rotatable in a open-and-close state, comprising:
- first conversion means, provided at an end portion opposite the hinge on a first inner surface of the first housing, for having two functions of a receiver and a transmitter, and is able to switch the functions;
- second conversion means, provided at the hinge, for having at least a function of a receiver;
- third conversion means, provided at another end portion opposite the hinge on a second inner surface of the second housing, for having a function of a transmitter;
- detection means for detecting a relative position between the first housing and the second housing; and control means for controlling means selected from among said first, second and third second conversion means based on relative positions detected by said detection means to function as at least one set of a receiver and a transmitter, wherein said control means controls:
- said first conversion means to function as a receiver and said third conversion means to function as a transmitter when the first and second inner surfaces are detected, as the relative positions, as being exposed to outside by opening the first and second housings, and
- said second conversion means to function as a receiver and said first conversion means to function as a transmitter when the first and second housings are detected, as the relative positions, as being closed such that the first inner surface of the first housing is exposed to the outside and the first inner surface of the second housing is substantially hidden from the outside.

* * * * *